(12) United States Patent
Schoela et al.

(10) Patent No.: US 6,699,544 B2
(45) Date of Patent: Mar. 2, 2004

(54) SELF-REINFORCED SHAPED ARTICLE

(75) Inventors: Egbert Schoela, Muellendorf (AT); Gerald Molnar, Gramatsneusiedl (AT); Robert Schwenninger, Deutsch Wagram (AT)

(73) Assignee: Roehm GmbH & Co. KG, Darmstadt (DE)

( * ) Notice: Subject to any disclaimer, the term of this patent is extended or adjusted under 35 U.S.C. 154(b) by 66 days.

(21) Appl. No.: 09/926,249

(22) PCT Filed: Jan. 17, 2001

(86) PCT No.: PCT/EP01/00489
§ 371 (c)(1),
(2), (4) Date: Oct. 1, 2001

(87) PCT Pub. No.: WO01/57117
PCT Pub. Date: Aug. 9, 2001

(65) Prior Publication Data
US 2003/0017289 A1 Jan. 23, 2003

(30) Foreign Application Priority Data
Feb. 3, 2000 (DE) .......................................... 100 04 452

(51) Int. Cl.⁷ ................................................. B32B 5/16
(52) U.S. Cl. ...................................................... 428/35.7
(58) Field of Search ......................................... 428/35.7

(56) References Cited

U.S. PATENT DOCUMENTS 4,159,301 A * 6/1979 Buser et al. ................ 264/331
5,851,606 A  12/1998 Visser ......................... 428/15

FOREIGN PATENT DOCUMENTS

EP  0 734 828  10/1996

OTHER PUBLICATIONS

Merriam–Webster's Collegiate Dictionary, 10th ed., (1999), p. 663 ("lecithin" defined).*

* cited by examiner

Primary Examiner—Sandra M. Nolan
(74) Attorney, Agent, or Firm—Oblon, Spivak, McClelland, Maier & Neustadt, P.C.

(57) ABSTRACT

A self-reinforcing semifinished product capable of thermoplastic shaping, composed of a single-layer sheet made from filled poly(meth)acrylate, where the semifinished sheet product contains a filler and has an upper side and a lower side, where the upper side is depleted with respect to fillers and the lower side is enriched with respect to fillers, in relation to the average filler content and a process for producing the semifinished products. The semifinished poly (meth)acrylate sheet products of the invention may be used in producing sanitary items, such as shower trays and washbasins, preferably by a high-performance shaping process, such as thermoforming.

33 Claims, No Drawings

SELF-REINFORCED SHAPED ARTICLE

The present invention relates to a semifinished product in the form of a sheet made from filled poly(meth)acrylate, to a process for producing poly(meth)acrylate sheets of this type, and also to mouldings, preferably sanitary items, which can be produced from the semifinished product.

The present invention relates in particular to a self-reinforcing semifinished product capable of thermoplastic shaping, composed of a single-layer sheet made from filled poly(meth)acrylate, where the semifinished sheet product has an average filler content $F_m$ in percent by weight, based on its total weight, an upper side U and a lower side L.

This semifinished product made from poly(meth)acrylate is used in particular for producing sanitary items, such as bathtubs, shower trays and sink bowls, preferably, with regard to shower trays and sink bowls, by high-performance shaping processes, such as thermoforming.

Sanitary items made from poly(meth)acrylate ("acrylic sheeting") are fundamentally manufactured by a production process which has two or more stages. Acrylic sheeting is first produced, and is then thermoformed. Reinforcement has to be provided since the mechanical properties of the moulding are inadequate. One way of doing this is by spray-application and curing of a polymerizable reactive resin (styrene/chopped glass fibre mixture) onto the reverse side of the moulding. A sheet of timber, likewise secured by spraying glass fibre resin material, is often also introduced here to reinforce the base.

Once the reinforcing materials have been sprayed on or applied, fibres (chopped glass fibre) not lying flat on the reverse side of the sanitary item have to be flattened by manual rolling.

In addition, under certain circumstances the sanitary item also has to be annealed after the operations described above, in order to polymerize the reinforcement layer and finally complete its curing.

Disadvantages of this process are the various manpower-intensive operations and the undesirable emissions of solvent during any type of backing-application process, and also the handling of glass fibre, which is a major risk per se. Finally, the processing of various plastic components and of the mixture of materials comprising reinforcing materials and plastics gives the sanitary items poor recyclability.

The process of WO 98/45375=PCT/EP98/01881 makes some progress in avoiding the disadvantages referred to. According to this publication, the reinforcement layer is composed of a cold-curing (meth)acrylate resin which has a content of from 1 to 75 percent by weight of fine fillers with particle size not above 100 μm. This permits a sanitary item which is completely recyclable and nevertheless complies with the mechanical properties required to be provided without use of any fibrous fillers, such as asbestos or chopped glass fibre. However, the application of the reinforcement layer by a spraying process is not entirely without problems, at least from the point of view of employee safety, particularly since there is a health risk to operators.

WO 97/46625=PCT/GB97/01523 (ICI) proposes reducing the risk to manpower and operators by using aqueous redox systems to cure the spray-applied (meth)acrylate system. Although this reduces the adverse effects of solvents (ethyl methyl ketone, other ketones and organic solvents and the like) during the spraying procedure, spraying itself is an operation not entirely free from risk, for example, mention should be made of the very fine dispersion, unavoidable during spraying, of comparatively volatile polymerizable constituents of the (meth)acrylate resin. The MAC values for MMA and other monomers are in fact relatively low and are much more rapidly achieved during spraying than, for example, during processing by other methods. It would be particularly desirable to be able to dispense with the subsequent spraying-on or application of a reinforcement layer.

In view of the prior art mentioned and discussed herein, an object of the invention was to provide a semifinished product made from poly(meth)acrylate from which the sanitary items described in some detail above can be produced at the lowest possible production cost.

The provision of fully recyclable reinforced sheets made from poly(meth)acrylate ("acrylic sheeting") is likewise an object of the invention.

Another object is that the process for producing the semifinished product, and also for producing the sanitary items, is to be attended by the lowest possible level of emissions (solvents, volatile and hazardous substances, such as monomers and the like).

The semifinished product should, furthermore, be capable of being produced and processed by conventional current industrial production processes.

A still further object of the invention is the provision of completely recyclable mouldings, such as shower trays or washbasins, which are fully recyclable, as far as possible without any risk to operators, in particular using the depolymerization method known for acrylic sheeting, by means of metal baths.

Another object of the invention is to provide a semifinished product in the form of a sheet, the sanitary items produced from which, preferably shower trays or washbasins, meet the general requirements placed on the stability of sanitary items of precisely this type, while giving the highest possible materials-related savings.

Furthermore, the formation of cracks in the sanitary item, a particular risk during high-performance shaping of poly(meth)acrylate sheets (semifinished products), should be suppressed to the greatest possible extent.

A still further object is the provision of a semifinished product in the form of a poly(meth)acrylate sheet with the best possible impact strength.

In addition, both the novel semifinished product and the novel sanitary item which can be produced from the same are to be as simple as possible to manufacture.

The extent of downstream manual operations is moreover to be reduced to a minimum.

Finally, automation of the process for producing the mouldings from reinforced poly(meth)acrylate sheets to the highest possible degree, and in a simple manner, plays a not insignificant part.

Another point of particular interest is the provision of a sanitary item made from reinforced poly(meth)acrylate sheets which have high and/or improved values for a number, or all, of such mechanical parameters as abrasion resistance, flexural strength (measured on the inner side (upper side) of the moulded acrylic sheet), flexural strength (measured on the reverse side (lower side)), modulus of elasticity, impact strength (measured on the inner or upper side of the moulded acrylic sheeting), impact strength (measured on the reverse side (corresponding to "coated side" in the prior art)).

A semifinished product with all of the features of claim 1 achieves these objects together with other objects which can readily be inferred from the discussion of the prior art in the introduction or else rendered self-evident by the same, although they have not been specified in detail.

Advantageous embodiments of the semifinished product of the invention are provided by the claims dependent on the independent product claim.

With regard to a process, the features of the independent process claim solve the process aspects of the problem on which the invention is based. Advantageous versions of the process are protected by the process claims dependent on the independent process claim.

As far as the moulding is concerned, preferably a sanitary item, the appropriate claim within the set of claims supplies the solution for the underlying problem, and advantageous embodiments are provided by the claims dependent on this product claim.

A self-reinforcing semifinished product capable of thermoplastic shaping and used in particular for producing sanitary items, preferably by thermoforming, composed of a single-layer sheet made from filled poly(meth)acrylate, where the semifinished sheet product has an average filler content $F_m$ in percent by weight, based on its total weight, an upper side U and a lower side L, characterized in that the upper side U of the semifinished sheet product has been depleted with respect to fillers and the lower side L has been enriched with respect to fillers, in each case in relation to $F_m$, provides a semifinished product which can be used, for example in simple heat-assisted moulding processes, to produce sanitary items which give excellent compliance with all of the requirements set by standards institutes and by industrial processors in relation to the physical properties of the sanitary item, and which at the same time permit greatly simplified manufacture of sanitary items. In addition, it is possible to gain a large number of other advantages.

Among these are:

The semifinished product of the invention is "self-reinforcing", providing for the first time a sanitary-quality semifinished product from which a useful sanitary item, preferably a shower tray or washbasin, can be produced simply by heat-assisted shaping.

No backing, i.e. reinforcement layer applied after shaping the sanitary item, is applied during manufacture.

Further automation of the production process is achieved, and manual application of the reinforcement is dispensed with, as are manual downstream operations on the moulded and reinforced sanitary item.

Complete recyclability of the semifinished product, and also of the sanitary item produced from the same, by the known method of depolymerization of acrylic sheeting, inter alia by avoiding the use of polyesters (polyester-resin-free materials).

Excellent compliance with mechanical properties (namely cability for shaping, impact strength and stiffness) to DIN EN 249 (shower tray specification) and mechanical properties (namely cability for shaping and impact strength) to DIN EN 198 (bathtub specification), exceeding the levels required.

Excellent compliance with mechanical properties (impact strength) to DIN ISO 179, exceeding the levels required.

Excellent compliance with mechanical properties (flexural strength) to DIN ISO 178, exceeding the levels required.

Commercially available machinery and systems can be used in producing the semifinished product (the poly (meth)acrylate sheet) and the sanitary item, and the use of expensive and specialized tooling can therefore very substantially be dispensed with.

Since the production of the sanitary item from the poly (meth)acrylate sheet is preferably solvent-free, the risk of occurrence of stress cracks is minimized. Solvent-containing systems, such as those which can be used in applying a backing to moulded acrylic sheeting, tend to give stress cracks in the finished reinforcement layer, in particular in the DIN EN 249 temperature cycle test.

For the purposes of the invention, "self-reinforcing semi-finished product capable of thermoplastic shaping" means a single-layer sheet made from filled poly(meth)acrylate in sanitary quality which, after thermoforming to give a sanitary item to a maximum ratio between initial thickness and final thickness (prior to thermoforming and, respectively, after thermoforming) such as 1:0.2, preferably 1:0.25, particularly preferably 1:0.33, very particularly preferably 1:0.5, complies with the mechanical requirements given for sanitary items in the relevant standards (DIN EN 249, DIN ISO 178, DIN ISO 179), and specifically without any need for additional reinforcement.

The term "additional reinforcement" used here refers to the use of an additional layer to improve the mechanical properties of a single-layer sheet. The additional layer may have been laminated to the sheet, with or without adhesion promoter, or else may, for example, have been provided in the form of a reinforcing backing. The reinforcing effect here can be determined, for example, by way of the modulus of elasticity to DIN 53 457. Any increase in the modulus of elasticity of the reinforced sheet compared with that of the sheet without any additional layer is to be interpreted here as reinforcement.

"Self-reinforcing" therefore implies improvement of the mechanical properties of a single-layer sheet (of the semifinished product) without any additional reinforcement layer, the sheet essentially consisting of a single layer of filled poly(meth)acrylate.

"Filled poly(meth)acrylate" means poly(meth)acrylate comprising fillers.

For the purposes of the invention, "semifinished product" means a precursor in the form of a sheet intended for further processing and made from filled poly(meth)acrylate. The precursors in the form of sheets are used to produce finished products (sanitary items) of any desired form and dimensions by way of downstream manufacturing processes (preferably heat-assisted forming, particularly preferably high-performance shaping processes, such as thermoforming).

The term "sheets" is intended to mean sheet-like structures of any desired geometry, for example those of round, angular, semicircular or other shape. The sheets are preferably square or rectangular.

The "upper side U" of the semifinished sheet product of the invention is the surface of the inner side of the sanitary item obtainable by moulding the semifinished product. The inner side of the sanitary article is the side which generally comes into contact with water during correct use, i.e. the inner side in the case of tubs, trays or basins.

The "lower side L" of the semifinished sheet product of the invention is the surface of the outer side of the sanitary item obtainable by moulding the semifinished product. The outer side of the sanitary item is the side which does not generally comes into contact with water during correct use.

The "average filler content $F_m$" of the semifinished sheet product is calculated by taking the ratio between the weight of the fillers present in the semifinished sheet product and the total weight of the semifinished sheet product, and multiplying by the factor 100. The filler content $F_m$ is advantageously in the range from 20 to 80 percent by weight, preferably from 30 to 70 percent by weight, particularly advantageously from 40 to 60 percent by weight. The amount of filler present in the semifinished product of the invention can have a decisive effect on the mechanical properties.

According to the invention, the upper side U of the semifinished product has been depleted with respect to fillers and the lower side L has been enriched with respect to fillers, in each case in relation to $F_m$. Depleted means that the local content of fillers in the region of the upper side is smaller than $F_m$, and enriched means that the local content of fillers in the region of the lower side is greater than $F_m$.

"Local content of fillers" means the filler concentration in a unit element of volume, determined in [kg·m$^{-3}$]. The depletion of fillers in the region of the upper side of the semifinished product permits particularly advantageous production of a high-gloss surface, while the enrichment of the fillers in the region of the lower side of the semifinished product is particularly desirable for reinforcing action.

Semifinished products of particular interest for the invention are those characterized by a thickness d, which, viewed in cross section, extends from U to L, so that at U the value of d is zero and at L the value of d is 1·d, where that section of the semifinished sheet product between 0 and 0.1·d has an average filler content $F_U$ in percent by weight which is less than $F_m$, whereas that section of the semifinished sheet product between 0.9·d and 1·d has an average filler content $F_L$ in percent by weight which is more than $F_m$. $F_U$ is determined in the same way as $F_m$, but for a layer of defined thickness near to the upper side. Similarly, $F_L$ is determined for a layer of defined thickness near to the lower side of the semifinished product.

The distribution of the filler in the semifinished product may be "layered" or follow, approximately or precisely, a gradient. If the distribution of the filler can be described by a gradient or as being of gradient type, the filler gradient is advantageously not continuous, but discontinuous.

In one particular version, the semifinished product of the invention is also characterized by a discontinuous filler concentration gradient from U to L, representing a discontinuous change with increasing thickness of the sheet. This permits, for example, certain particularly stressed regions of sanitary items to be reinforced.

One way of producing a semifinished product with a discontinuous filler gradient of this type is to use certain production processes. If the semifinished product is produced by relatively slow polymerization of a comparatively low-viscosity polymer syrup, the reinforcing fillers can settle out under the influence of gravity.

As stated above, one possible result of the depletion of the fillers in the region of the upper side is a high-gloss surface on the resultant sanitary items. It is particularly desirable here for the semifinished product to be free from fillers beyond a certain depth, determined from the upper side. In one particular version of the invention, the concentration of the fillers at the surface U in the region from 0 to 0.01·d, preferably from 0 to 0.05·d, particularly preferably from 0 to 0.1·d, is zero.

The nature, form and amount of the fillers present in the semifinished product in the form of a sheet may be varied over a wide range depending on the specific desired application. Fillers which may be used advantageously during production of the self-reinforcing semifinished product include talc, dolomite, naturally occurring adhesions of talc and dolomite, mica, quartz, chlorite, aluminium oxide, aluminium hydroxide, clays, silicon dioxide, silicates, carbonates, phosphates, sulphates, sulphides, oxides, metal oxides, powdered glass, glass beads, ceramics, kaolin, porcelain, crystobalite, feldspar, chalk, carbon and/or inert-gas-filled hollow microparticles.

Preference is in principle also given to silanized grades of fillers, since the adhesion to the matrix achievable by way of the silanization is better than that of non-silanized fillers.

Among the types of filler, those of particular interest are minerals comprising mica, chlorite, quartz, for example ®Plastorit grades from the company Naintsch, talc-dolomite adhesions, in particular white talc-pure dolomite adhesions, BC microgrades from Naintsch, ®DORSILIT crystalline quartz flour from the company Dorfner, ®SIL-CELL microcellular additive combinations from the company Stauss, St. Pölten, ™Scotchlite hollow glass microbeads from the company 3M, ™Dualite hollow polymer microbeads from the company Pierce & Stevens Corp., ®Extendospheres XOL Hollow Microspheres from The PQ Corporation and ®Apyral grades (aluminium hydroxides) from the company Nabaltec.

In relation to microparticles, use may be made of a wide variety of these. In principle, they are hollow particles which may be regular or irregular, but preferably globular or spherical and having an inert gas in their cavity.

Hollow microbeads which may be used include in principle hollow microbeads made from a variety of materials, e.g. glass, metals, metal oxides, polymers or organic compounds.

For the invention it is preferable to use hollow microbeads made from plastic and composed of polymers, such as polystyrene, polyvinyl chloride, polyvinylidene chloride, polyvinyl acetate, polyacrylate, polyacrylonitrile, polybutadiene, polyethylene terephthalate; other preferred hollow microbeads are those made from copolymers or from terpolymers, based on the monomers which form the copolymers mentioned.

Examples of these polymers and copolymers which form the actual hollow beads are vinylidene chloride-acrylonitrile copolymer, polyvinylidene chloride, acrylonitrile-vinylidene chloride copolymer, acrylo-nitrile-methacrylonitrile copolymer, acrylonitrile-divinylbenzene-vinylidene chloride copolymer, and the like.

It is also preferred for the purposes of the invention to use a mixture of hollow microbeads.

The hollow microbeads or microparticles which can be used according to the invention may have been coated with coatings for adapting processing properties or for varying reinforcement properties.

Modifications of the simple hollow microbeads are also particularly suitable. For example, hollow microbeads which are of particular interest are those composed of polymers which have been covered (coated) with mineral substances in order to ensure better stability with respect to the influence of the surrounding medium.

The coating of the hollow microbeads may be composed of very fine-grain mineral substances, e.g. calcium carbonate, quartz, mica, aluminium hydroxide, crystobalite, or the like.

Particular preference is given to hollow microbeads which have been coated with calcium carbonate, in particular hollow microbeads made from plastic.

An example of an overview of the production of the hollow microbeads is found in Mat. Res. Soc. Symp. Proc. Vol. 372, 1995 Materials Research Society, in the contribution by David L. Wilcox, Sr. and Morris Berg, pp. 3 to 13, and in the literature cited therein.

Particularly suitable grades of gas-filled hollow microbeads made from plastic include ®Dualite grades, e.g. ®Dualite M 6032 (Pierce & Stevens Corp.); ®Expancel grades, e.g. ®Expancel 642 WU, ®Ropaque grades, e.g. ®Ropaque OP 62 (Rohm and Haas Co.), Matsumoto microspheres, e.g. Microsphere F-30E (Matsumoto Yushi Seiyaku Co. Ltd.), and the like.

The morphologies of the types of filler mentioned may differ. They may be spherical or non-spherical, but less preference is given to fillers having the shape of fibres or fragments. If the reinforcing fillers present have a lamellar or acicular shape, the resultant self-reinforcing semifinished products have particularly good combinations of properties. If the fillers are globular, or in particular lamellar or acicular, they permit orientation of the particles along the direction of flow of the plastic material as it flows under the action of heat and/or pressure during moulding of the semifinished product to give sanitary items, for example by way of high-performance shaping processes, such as thermoforming. This orientation of the reinforcing filler particles, preferably parallel to the surface of the semifinished product in the form of a sheet, can give a balanced stiffness-impact strength ratio in the moulded sanitary item, and permits good surface quality of the sanitary item, and gives adequate flow line resistance, and can improve heat resistance, and generally exerts a favourable effect on the feel of the finished sanitary item.

In one particular embodiment of the resultant semifinished product of the invention, the filler particles used are laminar fillers. For the purposes of the invention, these are fillers which can assume a preferred orientation during flow (moulding of the thermoplastically mouldable semifinished product).

The size of the filler particles can also play a part in determining the quality of the semifinished product of the invention. For example, the stiffness of the semifinished product, and therefore of the resultant sanitary item, can be controlled by way of suitable dimensioning of the fillers. The grain size range generally used for the reinforcing fillers is from is about 0.01 to about 100 $\mu$m. The average particle size of the filler used is advantageously in the range from 0.01 to 80 $\mu$m, in particular in the range from 0.05 to 30 $\mu$m, very particularly advantageously in the range from 0.1 to 20 $\mu$m.

The finer the reinforcing fillers used, the higher the stiffness and impact strength of the sanitary item. The resultant semifinished products become more brittle as the fillers become larger. According to the invention, particularly advantageous semifinished products are characterized in that the residue from the fillers used on screening at 20 $\mu$m is below two percent by weight.

The thickness of the semifinished sheet products is variable. The invention therefore covers self-reinforcing semifinished products which are either relatively thick or else relatively thin. The smallest possible thickness is generally desirable, due to the materials-related savings associated therewith. The thickness d of the semifinished product is preferably in the range from 1.5 to 12 mm, preferably from 2 to 10 mm, particularly preferably from 4 to 8 mm, still more preferably from 4.5 to 7 mm.

The semifinished products of the invention are obtainable, for example, by polymerizing a (meth)acrylate system by a casting process, preferably by the cell-casting process or by a variant thereof, where the polymerizable system comprises:

| A) | a) | (meth)acrylate | 50–100% by wt. |
|---|---|---|---|
|  | a1) | methyl (meth)acrylate | 0–99.99% by wt. |
|  | a2) | $C_2$–$C_4$ (meth)acrylate | 0–99.99% by wt. |
|  | a3) | $\geq C_5$ (meth)acrylate | 0–50% by wt. |
|  | a4) | (meth)acrylates of functionality two or higher | 0.01–50% by wt. |

-continued

| b) | comonomers | 0–50% by wt. |
|---|---|---|
| b1) | vinylaromatics | 0–50% by wt. |
| b2) | vinyl esters | 0–50% by wt., | where the selection of components a) and b) is such that together they give 100 percent by weight of the polymerizable component A), B) for each part by weight of A), 0–12 parts by weight of a (pre)polymer soluble or swellable in A), C) initiator, the amount being sufficient to cure the polymerizable component A), D) where appropriate, means of adjusting the viscosity of the system, E) for each part by weight of A), an amount of up to 3 parts by weight of conventional additives and F) for each part by weight of binder (total of A) to E)), from 0.25 to 4 parts by weight of fillers.

One way of achieving depletion of the reinforcing fillers at the surface U, and also enrichment of the reinforcing fillers at the lower side L of the sheet is to utilize the viscosity of the (meth)acrylate system to be polymerized to obtain the semifinished product. The semifinished product of the invention is preferably obtainable by polymerizing a (meth)acrylate system which prior to polymerization has a viscosity in the range from 0.02 to 0.1 Pa·s (from 20 to 100 cP), preferably from 0.03 to 0.08 Pa·s (from 30 to 80 cP), particularly preferably from 0.04 to 0.06 Pa·s (from 40 to 60 cP), very particularly advantageously about 0.05 Pa·s (50 cP). Use of the preferred viscosity range during polymerization of the sheet is particularly successful in achieving a high-gloss surface. However, at the same time it is possible to achieve uniform distribution of pigments or of other conventional fillers, where these are very much finer than the reinforcing fillers. The invention is therefore successful in combining colour and high-gloss surface with adequate self-reinforcing action in the sanitary item of the invention.

The invention also includes a process for producing a semifinished product in the form of a sheet, in which a) a polymerizable, filled (meth)acrylate formulation is prepared, b) the formulation prepared is poured into a prepared mould, c) the formulation polymerizes in the mould at a temperature above room temperature to give a semifinished product of sheet type, and d) the semifinished product is demoulded, characterized in that
the viscosity of the polymerizable, highly filled (meth) acrylate formulation prior to polymerization in the mould is adjusted to a value in the range from 0.02 to 0.1 Pa·s (from 20 to 100 cP), preferably from 0.03 to 0.08 Pa·s (from 30 to 80 cP), particularly preferably from 0.04 to 0.06 Pa·s (from 40 to 60 cP), very particularly advantageously about 0.05 Pa·s (50 cP).

A first advantageous process variant of the invention is characterized in that the viscosity of the polymerizable formulation is regulated by varying the ratio by weight of (pre)polymer to polymerizable monomers in the formulation.

As an alternative to this, or combined with this, it can also be advantageous to regulate the viscosity of the formulation by varying the proportion of viscosity-adjusting agents.

These agents which adjust, i.e. regulate, viscosity are known per se to the person skilled in the art. They include ionic, nonionic and zwitterionic emulsifiers.

In particularly preferred modifications of the process according to the invention, the viscosity-adjusting agent used comprises an emulsifier, preferably one or more lecithins.

Other advantageous means or processes for influencing and/or adjusting the viscosity of the polymerizable formulation encompass the following measures, inter alia:

The viscosity of the polymerization system may be varied by adding regulator.

It can be advantageous to control the viscosity of the polymerization system by way of the mixing ratio between (pre)polymer and monomeric, polymerizable constituents of the polymerization system.

The nature and amount of wetting additives used, such as the lecithin mentioned, or else ®Catafor or the like, can permit adjustment of the viscosity to the desired value.

The filler concentration per se affects the viscosity of the polymerization system, as does the nature of the filler or of the filler mixture (grain size, oil absorption value, surface treatment).

In addition, the viscosity of the polymerization system may be changed by conventional additives, such as agents with thixotropic action (such as ®Aerosil grades).

The polymerization temperature may also be used to influence the viscosity of the system.

Finally, the initiator concentration and the kinetics of the polymerization reaction can exert an influence on the viscosity of the polymerization system and therefore on the degree of settling-out of the fillers.

The semifinished products of the invention may be moulded by thermoplastic shaping processes known per se. The invention therefore also includes mouldings made from a semifinished sheet product described herein.

In a particular embodiment, the moulding of the invention is characterized in that the moulding is a sanitary item produced by thermoplastic forming of a semifinished sheet.

For the purposes of the invention, sanitary items are, inter alia, basins, certain shapes of tubs, trays and similar forms, which may also be irregular. Particular preference is given to shower trays and washbasins. One particular embodiment of the invention encompasses mouldings characterized in that the moulding is a shower tray produced by thermoforming a semifinished sheet.

As described a number of times above, the semifinished products of the invention are semifinished poly(meth) acrylate products. These have high, preferably predominant, i.e. major, content, 50 percent by weight or more, of poly (meth)acrylates. Poly(meth)acrylates are polymers assumed to have structural units of the formula (I)

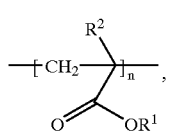
(I)

where
R$^1$ is an organic radical, preferably C$_1$–C$_6$-alkyl, preferably C$_1$–C$_4$-alkyl,
R$^2$ is H, C$_1$–C$_6$-alkyl, preferably H or C$_1$–C$_4$-alkyl, very particularly preferably H or CH$_3$, and
n is a positive integer greater than 1.

C$_1$–C$_4$-alkyl encompasses linear or branched alkyl radicals having from one to four carbon atoms. Methyl, ethyl, n-propyl, isopropyl, n-butyl, 2-methyl-1-propyl, sec-butyl and 2-methyl-2-propyl are of particular interest.

C$_1$–C$_6$-alkyl encompasses the radicals mentioned for C$_1$–C$_4$-alkyl and also radicals having 5 or 6 carbon atoms, preferably 1-pentyl, 2-pentyl, 3-pentyl, 2,2-dimethyl-1-propyl, 3-methyl-1-butyl, 3-methyl-2-butyl, 2-methyl-2-butyl, 2-methyl-1-butyl, 1-hexyl.

Examples of compounds which have the abovementioned structural unit include polymethyl acrylate, polyethyl acrylate, polymethyl methacrylate, polypropyl acrylate, polybutyl acrylate, polypropyl methacrylate, polybutyl methacrylate and copolymers which contain two or more of these types of polymer. For the purposes of the invention preference is given to the first four compounds. Polymethyl methacrylate (PMMA) is very particularly preferred.

Besides the chemical mixtures (random copolymers, or else block copolymers) produced by copolymerizing at least two substituted or unsubstituted acrylate monomers (e.g. methyl methacrylate-n-butyl methacrylate copolymers), is also possible for the purposes of the invention to use poly(meth)acrylate sheets made from copolymers which contain up to 50% by weight of at least one other vinylically unsaturated monomer copolymerizable with at least one substituted or unsubstituted acrylate monomer.

Examples of these are methyl methacrylate-styrene copolymers and methyl methacrylate-butyl acrylate-styrene terpolymers.

The comonomers are optional constituents or components preferably present in subordinate amounts in the form of copolymers containing the same within the acrylic sheeting. Their selection is generally such that they have no disadvantageous effect on the properties of the poly(meth)acrylate to be used according to the invention.

The comonomer(s) mentioned may, inter alia, be used to modify the properties of the copolymers in a desired manner, for example by raising or improving the level of flow properties when the copolymer is heated to the melting point during its processing to give a semifinished product or to reduce residual colour in the copolymer, or to introduce a certain or defined extent of crosslinking into the copolymer by using a polyfunctional monomer.

Monomers suitable for this purpose include vinyl esters, vinyl chloride, vinylidene chloride, styrene, α-methylstyrene and the various halogen-substituted styrenes, vinyl ethers, isopropenyl ethers, dienes, such as 1,3-butadiene and divinylbenzene. One particularly preferred way of achieving colour reduction in the copolymer is to use an electron-rich monomer, such as a vinyl ether, vinyl acetate, styrene or α-methylstyrene.

Among the comonomer compounds mentioned, particular preference is given to aromatic vinyl monomers, such as styrene or α-methylstyrene.

Physical mixtures, known as blends, are also preferred for the poly(meth)acrylate sheets (semifinished products).

The semifinished product of the invention or the poly (meth)acrylate sheet of the invention may also comprise conventional additives. These include antistats, antioxidants, mould-release agents, flame retardants, lubricants, dyes, flow improvers, fillers, light stabilizers and organic phosphorus compounds, such as phosphites or phosphonates, pigments, agents with thixotropic action, UV stabilizers, weathering stabilizers and plasticizers.

Fillers are generally solid additives which differ substantially from the poly(meth)acrylate matrix in their formulation and structure. The materials here may be either inorganic or organic. They are well known to the person skilled in the art.

The fillers used are preferably inert under the conditions of depolymerization of the poly(meth)acrylates. For the purposes of the invention, fillers inert under the conditions of depolymerization of the poly(meth)acrylates are substances which neither prevent the depolymerization of (meth)acrylate polymers nor have any substantial adverse effect on the same. This property of the fillers permits simple recycling of the mouldings, such as shower trays or washbasins, which can be produced from the semifinished products (poly(meth)acrylate sheets).

Poly(meth)acrylates, especially PMMA, are among the few plastics which have excellent suitability for direct chemical recycling. This means that, with suitable supply of heat, these polymers can be entirely broken down to give the corresponding monomeric building blocks (depolymerization) at certain temperatures and pressures. For example, there are various continuous and batch procedures described in the literature and in patent specifications for depolymerizing polymethyl methacrylate (PMMA) and reclaiming the resultant monomeric methyl methacrylate (MMA) by way of heat-treatment of waste acrylic sheeting at temperatures >200° C., condensation of the resultant monomer vapour and work-up of the crude monomers. In the process most frequently used industrially, the polymer material is charged to an externally heated vessel partially filled with lead. The polymer material depolymerizes at temperatures above 400° C., and the resultant monomer vapour passes via a pipeline into a condenser where it is condensed to give crude liquid monomer. An example of disclosure of depolymerization processes of this type is that in DE-A 21 32 716.

One way of obtaining the semifinished products of the invention is polymerization of a (meth)acrylate system in a casting process, preferably by the cell-casting process, Rostero process, or some other variant or modification of the cell-casting process, where the polymerizable system encompasses the abovementioned components A) to F).

Component A) is an essential constituent of the (meth)acrylate system to be polymerized.

The use of any bracketed constituent is optional, i.e. (meth)acrylate is acrylate and/or methacrylate.

Monomer component A) comprises at least 50% by weight of (meth)acrylate, preference being given to monofunctional (meth)acrylates having a $C_1$–$C_4$ ester radical. Longer-chain esters, i.e. those having an ester radical whose chain has 5 or more carbon atoms, have been limited to 50% by weight in component A). Component A) preferably comprises at least 40 percent by weight of methyl methacrylate.

The stated amount of the long-chain (meth)acrylates makes the system more impact-resistant. These esters therefore make the semifinished product more flexible, and also softer, and there are therefore limitations on performance at amounts above 50% by weight.

Besides the (meth)acrylates, component A) may also comprise other comonomers, the proportion of these being limited to 50% by weight. Among these comonomers, vinylaromatics and/or vinyl esters may be present in component A), in each case at up to 50% by weight.

Higher proportions of vinylaromatics are difficult to incorporate into the polymer and can lead to separation of the system. Higher proportions of vinyl esters may moreover give insufficiently thorough curing at low temperatures, and they tend to increase shrinkage.

Component A) preferably comprises from 80 to 100% by weight, particularly preferably from 90 to 100% by weight, of (meth)acrylates, since semifinished products produced using these monomers have desirable processing and performance characteristics for sanitary items. It is preferable for the proportion of $C_2$–$C_4$ esters in (meth)acrylates to have been limited to 50% by weight in component A), and the amount of these esters present in component A) is with preference not more than 30% by weight, and particularly advantageously not more than 20% by weight. This enables particularly flexible layers to be constructed.

Particularly suitable monofunctional (meth)acrylates are methyl methacrylate, butyl methacrylate, butyl acrylate, 2-ethylhexyl acrylate, ethyl triglycol methacrylate, hydroxypropyl methacrylate.

Particularly suitable comonomers are vinyltoluene, styrene, vinyl esters.

There is preferably a restriction to not more than 20% by weight of styrene in A), since higher content can lead to problems during polymerization.

(Meth)acrylates whose functionality is two or higher are also essential in component A). The (meth)acrylates whose functionality is two or higher have crosslinking action in the polymerization, contributing, inter alia, to reduction of water absorption of the semifinished product and thus of the final sanitary item. (Meth)acrylates whose functionality is two or higher are preferably present in the (meth)acrylate system of component A) in amounts of from 0.1 to 30% by weight, particularly advantageously in amounts of from 0.2 to 5% by weight. The (meth)acrylates whose functionality is two or higher serve to link linear polymer molecules. This can influence properties such as flexibility, scratch resistance, glass transition temperature, melting point or curing behaviour.

(Meth)acrylates whose functionality is two or higher and whose use is preferred include:

(1) Bifunctional (meth)acrylates
Compounds of the general formula:

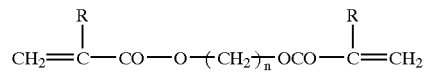

where R is hydrogen or methyl and n is a positive integer from 3 to 20, e.g. the di(meth)acrylate of propanediol, of butanediol, of hexanediol, of octanediol, of nonanediol, of decanediol or of eicosanediol; compounds of the general formula:

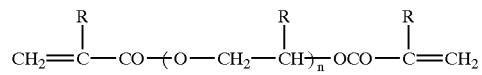

where R is hydrogen or methyl and n is a positive integer from 1 to 14, for example the di(meth)acrylate of ethylene glycol, of diethylene glycol, of triethylene glycol, of tetraethylene glycol, of dodecaethylene glycol, of tetra-decaethylene glycol, of propylene glycol, of dipropylene glycol or of tetradecapropylene glycol; and glycerol di(meth)acrylate, 2,2'-bis[p-(γ-methacryloxy-β-hydroxypropoxy)phenylpropane] or bisGMA, bisphenol A dimethacrylate, neopentyl glycol di(meth)acrylate, 2,2'-di(4-methacryloxy-polyethoxyphenyl)propane having from 2 to 10 ethoxy groups per molecule and 1,2-bis(3-methacryloxy-2-hydroxypropoxy)butane.

(2) (Meth)acrylates of functionality three or higher
Trimethylolpropane tri(meth)acrylates and pentaerythritol tetra(meth)acrylate.

The usual preferred (meth)acrylates whose functionality is two or higher encompass, among others, triethylene glycol dimethacrylate (TEDMA), trimethylolpropane trimethacrylate (TRIM), 1,4-butanediol dimethacrylate (1,4-BDMA), ethylene glycol dimethacrylate (EDMA).

Other preferred components of a (meth)acrylate system to be used according to the invention are urethane (meth) acrylates whose functionality is two or higher.

These are obtainable, for example, in a conventional and well known manner from isocyanate-containing prepolymers into which olefinic double bonds are introduced by means of hydroxyl-containing compounds, e.g. hydroxyethyl acrylate, hydroxyethyl methacrylate, allyl alcohol, vinyl alcohol, etc. Besides urethane (meth)acrylates known per se, novel urethane (meth)acrylates play a particular part in the invention.

Very particularly advantageous layers are obtained using certain novel urethane (meth)acrylates. These have at least three reactive terminal ethylenically unsaturated functions derived from (meth)acrylates.

They are obtainable by reacting hydroxyalkyl (meth) acrylates with polyisocyanates and with polyoxyalkylenes which have at least three hydroxyl functions, the proportion of polyethylene oxide being less than 50% by weight, based on the total amount of polyoxyalkylene.

Hydroxyalkyl (meth)acrylates which may be used according to the invention are esters of (meth)acrylic acid with dihydric aliphatic alcohols. These compounds are well known to the person skilled in the art. They may be prepared, for example, by reacting (meth)acrylic acid with oxiranes.

The oxirane compounds include ethylene oxide, propylene oxide, butylene 1,2-oxide and/or butylene 2,3-oxide, cyclohexene oxide, styrene oxide, epichlorohydrin and glycidyl esters. These compounds may be used either individually or else as a mixture. Examples of descriptions of the reaction to give the hydroxyalkyl (meth)acrylates are given in DE-A-24 39 352, DE-15 68 838 and GB 1 308 250.

Many of the resultant hydroxyalkyl (meth)acrylates are commercially available and therefore particularly suitable for the purposes of the invention.

The hydroxyalkyl (meth)acrylates may also contain substituents, such as phenyl radicals or amino groups. The hydroxyalkyl radical of the ester may moreover contain polyoxyalkylene groups which may be either linear or else branched, for example polyethylene oxide, polypropylene oxide and polytetramethylene oxide. These groups frequently have from 2 to 10 oxyalkylene units.

Preferred hydroxyalkyl (meth)acrylates include hydroxyethyl acrylate, hydroxyethyl methacrylate, 2-hydroxypropyl acrylate, 2-hydroxypropyl methacrylate, 3-hydroxypropyl acrylate, 3-hydroxypropyl methacrylate, 6-hydroxyhexyl acrylate and 6-hydroxyhexyl methacrylate, 3-phenoxy-2-hydroxypropyl methacrylate, polyethoxy methacrylate, polypropoxy methacrylate, polyethylene oxide-polytetramethylene oxide methacrylate, polyethylene oxide-polypropylene oxide methacrylate, 4-hydroxybutyl acrylate, 2-hydroxyethyl acrylate, N-hydroxymethylmethacrylamide, caprolactam hydroxyethyl methacrylate and caprolactam hydroxyethyl acrylate, of which very particular preference is given to hydroxyethyl methacrylate, hydroxyethyl acrylate, 2-hydroxypropyl methacrylate and 2-hydroxypropyl acrylate.

For the purposes of the present invention, polyisocyanates are low-molecular-weight compounds whose molecule has two or more isocyanate groups.

The property profile in terms of elongation at break and ultimate tensile strength can be influenced as desired via a selection of the proportion of polyisocyanates having 3 or more isocyanate groups. The higher the proportion of compounds having three or more functions, the greater the ultimate tensile strength. However, at the same time there is a marked reduction in elongation at break. It has accordingly been found that the proportion of these polyisocyanates having three or more functions should not be more than 10% by weight, preferably not more than 5% by weight, based on the total weight of polyisocyanates. These statements, however, relate solely to the preparation of the urethane (meth)acrylates of embodiment A) described above whose use is particularly advantageous. In embodiment B), in which the polyoxyalkylenes having two hydroxyl groups are linked via polyisocyanates which have three or more isocyanate groups, the proportion of the polyisocyanates having three or more functions is appropriately larger.

Polyisocyanates which may be used in the present invention include tolylene 2,4-diisocyanate, tolylene 2,6-diisocyanate, diphenylmethane 4,4'-diisocyanate (MDI), dicyclohexyl 4,4'-diisocyanate, meta- and para-tetramethylxylylene diisocyanate, 3-isocyanatomethyl-3,5, 5-trimethyicyclohexyl isocyanate (isophorone diisocyanate), hexamethylene diisocyanate, 1,5-naphthylene diisocyanate, dianisidine diisocyanate, di(2-isocyanatoethyl) bicyclo[2.2-]hept-5-ene-2,3-dicarboxylate, 2,2,4- and 2,4,4-trimethylhexamethylene diisocyanate, triphenylmethane 4,4',4"-triisocyanate, tris(4-isocyanatophenyl) thiophosphate, and mixtures of these.

Another way of obtaining suitable polyisocyanates is the reaction of polyhydric alcohols with diisocyanates, or the polymerization of diisocyanates. It is also possible to use polyisocyanates which can be prepared by reacting hexamethylene diisocyanate with small amounts of water. These products contain biuret groups.

These compounds are well known to the person skilled in the art, and many of them are commercially available. They include ®Desmodur H, ®Desmodur N 100, ®Desmodur N 3300 (from BAYER), ®Basonat PLR 8401, ®Basonat PLR 8638 (from BASF), ®Tolonate HDB 75 MX, ®Tolonate HDT 90 (from Rhône Poulenc), ®Vestanat IPD, ®Vestanat T 1980/100 and ®Vestanat T 2960 (from Hüls).

Preference is given to compounds whose isocyanate groups have different reactivities. This property makes the conduct of the reaction easier, but this is not intended to constitute any restriction. An example of a preferred polyisocyanate of this type is isophorone diisocyanate.

For the purposes of the present invention, the analogous isothiocyanates are also suitable polyisocyanates. However, these compounds are less preferred since they have poorer commercial availability.

One way of obtaining polyoxyalkylenes which have at least three hydroxyl functions is polyaddition of cyclic ethers, such as oxiranes, or else tetrahydrofuran.

The oxiranes which may be used for the polyaddition include those mentioned above. Of these, preference is given to propylene oxide.

In order to obtain at least three hydroxyl functions which can react with isocyanate groups, the starter molecules used may, for example, comprise alcohols which have at least three hydroxyl groups.

These include glycerol, trimethylolpropane, erythritol, pentaerythritol, sorbitol and inositol, among which preference is given to glycerol.

The polyaddition of cyclic ethers onto polyhydric alcohols is well known to the person skilled in the art. An example of a reference in which the person skilled in the art may find useful information is Ullmann's Encyclopedia of Industrial Chemistry, 5th ed., keyword "Polyoxyalkylenes".

It is also possible for polyoxyalkylenes which have three or more hydroxyl functions to be prepared in situ. This is achieved by way of variant B), by using polyisocyanates having three or more isocyanate groups to link polyoxyalkylenes having two hydroxyl functions.

The weight-average molar mass of the polyoxyalkylenes may vary over a wide range. It is preferably in the range from 2000 to 20 000 g/mol, with preference in the range from 4000 to 10 000 g/mol and very particularly preferably in the range from 4000 to 8000 g/mol.

However, it is important that the polyether chains induce a minimum level of flexibility. The number-average length of the polyether chains should therefore be greater than 10 units, preferably greater than 20 units and very particularly preferably greater than 30 units.

The abovementioned cyclic ethers may also be used as a mixture, giving copolymers. It is also possible to use block copolymers of this type.

Some polyoxyalkylenes having at least three hydroxyl functions are commercially available.

Preferred polyoxyalkylenes are polyoxypropylenes. Preference may also be given to polytetramethylene oxides which may be used together with the polyoxypropylenes, each of these polyoxyalkylenes having at least three reactive terminal hydroxyl functions.

It is assumed that at least some of the particularly advantageous novel urethane (meth)acrylates can be described by the following formula (A.IV):

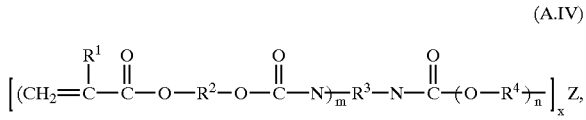

where $R^1$ is hydrogen or methyl, $R^2$ is a linear or branched alkylene group having from 2 to 20 carbon atoms, or alkylene oxides having from 4 to 50 carbon atoms, $R^3$ is an aromatic, aliphatic or cycloaliphatic group containing up to 18 carbon atoms and derived from diisocyanates or from diisocyanate mixtures, $R^4$ is an alkylene radical having at least 2 carbon atoms, with the proviso that at least half of all of the radicals $R^4$ of the urethane (meth)acrylate of the formula (A.IV) have 3 or more carbon atoms, m is an integer $\geq 1$, n is an integer $\geq 10$, x is an integer $\geq 3$ and z is a connecting group derived from alcohols having at least three hydroxyl groups or from polyisocyanates having at least three isocyanate groups.

The term "alkylene" means a bivalent radical obtained by starting with a hydrocarbon and removing two hydrogen atoms from non-adjacent carbon atoms, and encompasses alkylenes having 3 to 18 carbon atoms, for example 1,3-propylene, 1,4-butylene, 1,5-pentylene, 1,8-octylene and 1,10-decylene. These radicals may be either branched or linear. These groups may moreover have substitution.

The groups $R^2$ to $R^4$, and also the numbers m and n, derive from the starting materials used during the reaction. These have been described above. m is therefore preferably 1, but the ultimate tensile strength may also be increased by using polyisocyanates having three or more functional groups, so that some of the molecules can be represented by formulae in which m>1.

The connecting group Z is likewise dependent on the starting materials, as is the number x. The radical Z and the parameter x may also be influenced by way of the conduct of the reaction and the quantitative ratios of the starting materials. If glycerol is selected as Z, for example, the resultant connecting groups may include those of the formula (A.V)

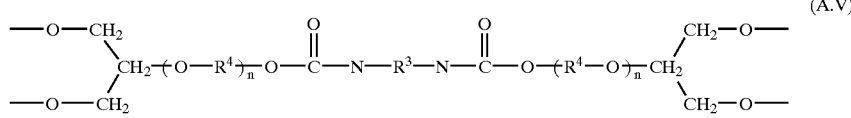
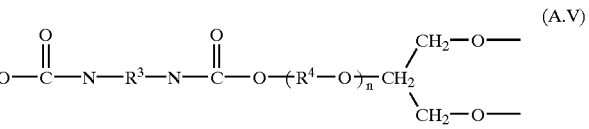

which may be produced by the coupling of two polyoxyalkylenes with polyisocyanates, where $R^3$, $R^4$ and n are as defined above. It is also possible for macromolecules to be formed which are produced by coupling of more than two polyoxyalkylenes.

Particularly preferred urethane (meth)acrylates for the present invention have three or four reactive terminal ethylenically unsaturated functions.

The preferred urethane (meth)acrylates for the invention may be prepared by processes in which i) at least one hydroxyalkyl (meth)acrylate is reacted with ii) at least one polyisocyanate and with iii) at least one polyoxyalkylene.

There are various possible reactions here. For example, urethane (meth)acrylates for the present invention may be prepared in a two-stage synthesis in which, for example, equimolar amounts of hydroxyalkyl (meth)acrylate and polyisocyanate are reacted, and the resultant reaction product is then allowed to react with a suitable amount of polyoxyalkylene. Choice of suitable polyisocyanates or of suitable conduct of the reaction can then give, in particular, urethane (meth)acrylates having three reactive terminal ethylenically unsaturated functions.

It is also possible to carry out the reaction in one step. This gives a mixture of urethane (meth)acrylates with a varied number of ethylenically unsaturated functions. It has been found that when trifunctional polyoxyalkylenes are used the products are frequently tetrafunctional urethane (meth) acrylates with the connecting groups (A.V) which have been described above by way of example. The resultant mixtures may be used as additive in the (meth)acrylate resins, without further purification.

The reaction may be carried out in bulk, i.e. without using any other solvent. It is also possible, if desired, to use an inert solvent. These include benzene, toluene and methyl isobutyl ketone (MIBK), methyl ethyl ketone (MEK).

The reaction of the isocyanate groups with the hydroxyl groups is well known to the person skilled in the art. The reaction temperature here may be varied over a wide range, but the temperature is frequently in the range from 30 to 120° C., preferably in the range from 60 to 90° C. The same applies to the pressure at which the reaction is completed.

The reaction may be carried out either at subatmospheric pressure or else at superatmospheric pressure. However, it is preferably carried out at atmospheric pressure. The reaction may take place in air or else in an inert gas atmosphere, and it is preferable for the proportion of oxygen present to be very small, since this inhibits any polymerization which is taking place.

To accelerate the reaction, use is frequently made of catalysts, such as tertiary amines, including 1,4-diazabicyclo[2.2.2]octane, N-methylmorpholine, N,N-diehtylcyclohexylamine and N,N,N',N'-tetramethyldiaminomethane, or of organic tin compounds, including dibutyltin dilaurate and tin dioctoate. These catalysts, and also the amounts used of these compounds, are well known to the person skilled in the art and are described in Ullmann's Encyclopedia of Industrial Chemistry, 5th ed., keyword "Polyurethanes", for example.

A Inhibitors which inhibit free-radical polymerization of the (meth)acrylates during the reaction may be added in the reaction. These inhibitors are well known to the person skilled in the art.

Component B) is an optional component, but is very preferably used.

There are in principle two different ways of preparing B). On the one hand, B) may be a polymeric substance which is mixed with A). On the other hand, A) may be prepolymerized, giving what is known as a syrup. This syrup itself then has monomeric constituents of group A) and polymeric constituents of group B), mixed with one another.

To adjust the viscosity of the resin, and the entire rheology of the system, and also for better thoroughness of curing, a polymer or prepolymer B) may—as stated—be added to component A). This (pre)polymer is to be soluble or swellable in A). For each part of A), use is made of from 0 to 12 parts of the prepolymer B). Poly(meth)acrylates are particularly suitable, and these may be used in the form of solid polymer dissolved in A) or as what are known as syrups, i.e. partially polymerized mixtures of appropriate monomers. Polyvinyl chloride, polyvinyl acetate, polystyrene, epoxy resins, epoxy (meth)acrylates, unsaturated polyesters, polyurethanes, and mixtures of these are also suitable. Examples of the effects of these polymers are specific flexibility properties, shrinkage control, stabilization or flow improvement.

For 1 part of A) it is preferable to use from 2 to 11 parts of B). It is particularly advantageous to use from 4 to 10 parts of B) for 1 part of A). It is very particularly preferable to take from 6 to 9 parts of a (pre)polymer and mix them with one part of polymerizable monomers A). It is preferable to dissolve the (pre)polymer B) in A).

In a preferred embodiment, the ratio by weight between components B) and A) of the binder is in the range from 1:1 to 12:1. An ideal balance of properties can be achieved within this range.

Particularly advantageous ratios B):A) by weight are in the range from 5:1 to 12:1.

Component B) ((pre)polymer) may be any desired polymer. It is particularly advantageously a suspension polymer, emulsion polymer and/or regrind. The average particle diameter of the (pre)polymers is then usually<0.8 mm.

The prepolymer B) is very advantageously a PMMA bead polymer obtainable by suspension polymerization. This polymer can permit the production of single-layer semifinished products with properties including adequate impact strength of resultant mouldings.

The average particle diameter of the bead polymer here is from about 0.1 to 0.8 mm. From 0.2 to 0.8 mm is preferred, in particular from 0.4 to 0.8 mm.

The (pre)polymer B) is preferably a copolymer, and the hardness and flexibility of the reinforcement layers here can be influenced via the nature and amount of the comonomer in the (pre)polymer B).Comonomers which may be used and are part of the structure of the respective (pre)polymer B) include acrylates and methacrylates other than methyl methacrylate (MMA), vinyl esters, vinyl chloride, vinylidene chloride, styrene, α-methylstyrene and the various halogen-substituted styrenes, vinyl and isopropenyl ethers, dienes, such as 1,3-butadiene and divinylbenzene.

Examples of preferred comonomers for methyl acrylate are ethyl acrylate, butyl acrylate, 2-ethylhexyl acrylate, ethyl methacrylate, n-butyl methacrylate, isobutyl methacrylate, 2-ethylhexyl methacrylate, propyl acrylate, propyl methacrylate, methacrylic acid, ethyl triglycol methacrylate, hydroxypropyl methacrylate.

Component C) is an essential component indispensable for the curing (polymerization) of the polymerizable system.

The polymerization may take place by a free-radical or ionic route, free-radical polymerization being preferred. Heat, radiation and initiators may be used for the polymerization, preferably initiators which form free radicals. The conditions for each polymerization depend on the monomers selected and on the initiator system, and are well known to the person skilled in the art.

Preferred initiators include the azo initiators well known to the person skilled in the art, such as AIBN or 1,1-azobiscyclohexanecarbonitrile, and also peroxy compounds, such as methyl ethyl ketone peroxide, acetylacetone peroxide, ketone peroxide, methyl isobutyl ketone peroxide, cyclohexanone peroxide, dibenzoyl peroxide, tert-butylperoxy benzoate, tert-butylperoxy isopropyl carbonate, 2,5-bis(2-ethyl-hexanoylperoxy)-2,5-dimethylhexane, tert-butylperoxy 2-ethylhexanoate, tert-butylperoxy 3,5,5-trimethyl-hexanoate, 1,1-bis(tert-butylperoxy)cyclohexane, 1,1-bis(tert-butylperoxy)-3,3,5-trimethylcyclohexane, cumyl hydroperoxide, tert-butyl hydroperoxide, dicumyl peroxide, bis(4-tert-butylcyclohexyl) peroxy-dicarbonate, mixtures of two or more of the abovementioned compounds with one another, and also mixtures of the abovementioned compounds which can likewise form free radicals that have not been mentioned.

Redox systems may also be used, and systems phlegmatized in organic solvents or in aqueous solutions or in aqueous suspension are also known and may be used. A system of this type is obtainable with the trademark ®Cadox from the company Akzo.

It is also possible to use mixtures of two or more initiators with stepped half-life times. This method can give better control of the polymerization reaction, local irregularities can be avoided and a more uniform result is obtained. This method can also shorten the post-polymerization time (annealing of the semifinished product in heating cabinets).

The amount of component C) is variable within wide limits. It depends on the formulation of the monomers, on the nature and amount of the (pre)polymer, and also on the desired polymerization temperature and the desired molecular weight of the polymer to be prepared. For example, guideline values generated for molecular weights from 10 000 to 200 000 (weight-average molecular weight) are from $2 \times 10^{-5}$ to about $1 \times 10^{-4}$ mol of initiator per mol of polymerizable constituents of the monomer system. Depending on the molecular weight of the initiator compound(s) used, from about $1 \times 10^{-3}$ to $5 \times 10^{-5}$ parts by weight of component C) may be used per part by weight of component A).

Component D) is an optional constituent of the polymerizable (meth)acrylate system, but one which is preferably present in the system. Examples are emulsifiers. Preference is given to lecithins. The amount of the substances to be used may be varied over a wide range. It is preferable to use from 0.01 to 1 part by weight of D) for each part by weight of A). It is particularly advantageous to use from 0.1 to 0.2 part by weight of D) for each part by weight of A).

Component E) is optional. These are the usual additives known per se, and examples of additives have been listed above. E) especially includes those fillers not falling within F). The category therefore takes in non-reinforcing fillers, such as colour pigments and the like, whose particle size is especially and preferably smaller than that of the fillers of component F).The average particle size of the fillers used as E) is preferably in the range less than 10 μm, advantageously in the range less than 5 μm, particularly preferably lets than 1 μm and very particularly preferably less than 0.01 μm. The ratio between the average particle sizes of the fillers E) and F) is advantageously in the range from 1:3 to 1:1000, preferably in the range from 1:5 to 1:100 and particularly preferably in the range from 1:10 to 1:50.

Component F) is essential, and this component has moreover been described in detail above.

The semifinished sheet of the invention may be used to obtain mouldings, by way of forming processes known per se. These include drawing, stretch forming, stretching, pressure forming, thermoforming, vacuum forming, pultrusion. Preferred processes are those in which the sheet is moulded while in the plastoelastic state. An example of a particularly highly suitable process is the heat-assisted moulding technique also termed thermoforming.

For this, the poly(meth)acrylate sheet is firmly clamped at the edge of the mould, and then the moulding is shaped as desired by forces which form the heated, unsupported blank. The forces used for forming may be generated by, inter alia, vacuum or compressed air, or be mechanical forces, e.g. those generated by plug-assists or hold-down plates, and these may be used individually or in combination. During the moulding process, the wall thickness of the poly(meth)acrylate sheet decreases.

The poly(meth)acrylate sheet here is preferably heated to a temperature in the range from 140 to 210° C., particularly preferably from 170 to 190° C.

The moulding apparatus therefore usually has a heating apparatus alongside the mould, to heat the sheet by infrared radiation or air, or by contact, for example, infrared heating being preferred, since this method heats the sheet uniformly but also permits targeted and local heating solely of certain regions of the sheet.

The heated sheet is then drawn into the mould. This takes place with the aid of the abovementioned forces used for forming. In the vast majority of embodiments of heat-assisted moulding apparatus, vacuum is used to remove air from the region between sheet and mould.

A distinction is also made between the positive and negative moulding processes. In the positive process, a precise reproduction is generated on the inner side of the moulding, since this side comes into contact with the mould. This shaping technique is known per se, and the person skilled in the art will find valuable information in Ullmann's Encyclopedia of Industrial Chemistry, Fifth Edition on CD ROM, 1998 edition, keyword "plastics processing" or in Kunststoff-Maschinen-Führer, Johannaber, 3rd edn. Hanser-Verlag, 1992, pp. 618 et seq.

EXAMPLES

1. Production of an Example of a Semifinished Product (Example 1)

1.1. Mould Construction

Two sheets of Sekurit glass are used as mould. A PVC sealing bead is placed between the glass sheets of the mould. Clamps are then used to secure three sides of the sheets of glass. The width of the cell can be varied by using a variety of thicknesses of sealing bead. In the example, the clearance providing the thickness of the cell was about 8 mm. The fourth side is sealed after filling. The resultant sealed sheet system is stored horizontally and placed in a water bath.

1.2. Poly(meth)acrylate System for Filling the Mould

| No. | Parts by weight | Substance | Group | % or parts (pts.) by weight |
|---|---|---|---|---|
| 2) | 36.69 | Methyl methacrylate | A) | 79.64% A) |
| 7) | 0.08 | Crosslinker[2]* | A) | 0.17% A) |
| 6) | 0.30 | Dimeric α-methylstyrene | A) | 0.65% A) |
| 1) | 10.00 | Prepolymer[3]*, corresponds to about 9.00 pts. of A) and 1.00 pts. of B) | A) B) | 19.54% A) 0.02 pts. of B) for each pt. of A) |
| 10) | 0.025 | Azovaleronitrile | C) | |
| 5) | 0.275 | Soya lecithin[5]* | D) | |
| 4) | 2.5 | Colour paste[6]* | E) | |
| 8) | 0.05 | ® Tinuvin 770[7]* | E) | |
| 9) | 0.08 | ® Aerosol OT[4]* | E) | |
| 3) | 50.00 | BC-Micro[1]* | F) | 1 pt. of F) for each pt. of Σ A)–E) |

[1]*BC-Micro special extender from the company Naintsch, A-8045 Graz-Andritz, Austria is a white talc-pure dolomite adhesion, the composition of which by chemical analysis is 12% of $SiO_2$, 22% of MgO, 24% of CaO, giving 40% loss on ashing for 1 h at 1050° C. Dolomite content (Leco) is 85%. Screen analysis to DIN 66165 to 20 μm gives 2.0% residue.
[2]*Crosslinker is triethylene glycol dimethacrylate (TEDMA).
[3]*Prepolymer is an MMA-based syrup, methyl methacrylate being prepolymerized in a manner known per se to conversion of about 10% (90% by weight of residual monomer). The viscosity of the prepolymer was about 450 cp.
[4]*® Aerosol OT is a dioctyl sodium sulphosuccinate from the company Cyanamid and is used as release agent/mould-release agent.
[5]*Soya lecithin is a product from the company Stern Lecithin and Soja GmbH, and is used as wetting agent for the fillers used.
[6]*Colour paste indicates a mixture essentially of titanium dioxide, colour pigments and dioctyl phthalate (DOP). The mixture is used for pigmenting sheets of the invention.
[7]*® Tinuvin 770 is a light stabilizer from the company Ciba - Spezialitätenchemie GmbH and belongs to the HALS product group.

1.3. Filling and Polymerization in the Cell

Ten parts of prepolymer and ten parts of methyl methacrylate form the initial charge; the stated amounts of the additives 4) to 9) are then metered in. The incorporation of the filler by dispersion begins after stirring for ten minutes. The dispersion time is about an hour. The stirred vessel is cooled during the dispersion procedure. After dispersion, the rest of the methyl methacrylate is admixed and homogenized. The initiator 10) is then stirred in, and the vessel is evacuated for 45 minutes. The mix described is poured into the mould; the mould is stored horizontally in a water bath at 62° C., and the contents are polymerized. The main polymerization achieves about 90% conversion. The sheets are post-polymerized in an annealing oven at 120° C. Once the sheets have been cooled, the upper sheet of glass is removed from the cell, and the semifinished product (poly (meth)acrylate sheet) is removed.

1.4. High-performance Shaping of the Semifinished Sheet of 1.3.

The semifinished product from 1.3. has a thickness of about 8 mm. A semifinished product of dimensions about 1.5×1.5 m is thermoformed to give a shower tray. This takes place as follows: the sheet to be shaped is secured in a metal frame. The upper and lower sides of the sheet are heated by infrared sources until the surface temperature has reached about 190° C. The infrared sources are then removed, and a mould is brought up to the lower side of the sheet to form an airtight seal against the sheet. The heated sheet is drawn into the mould by suction. The shaped article can be removed after cooling.

2 to 5

The method of manufacture of further sheets was as in Example 1. In Examples 2 to 5, variations were made in particular to the mixing specification for the poly(meth)acrylate system. The formulations of the systems used were as follows:

Formulation of (meth)acrylate systems 2 to 5 for Examples 2 to 4 and Comparative Example 5, in parts by weight in each case:

| Substance | Ex. 2 | Ex. 3 | Ex. 4 | Comp. Ex. 5 |
|---|---|---|---|---|
| Methyl methacrylate | 30 | 40 | 50 | 3 |
| TEDMA[8]* | 0.08 | 0.08 | 0.08 | 0.025 |
| Dimeric α-methylstyrene | 0.3 | 0.3 | 0.3 | 0.3 |
| Prepolymer | 20 | 10 | 0 | 44 |
| Azovaleronitrile | 0.025 | 0.025 | 0.025 | 0.025 |
| Soya lecithin[9]* | 0.3 | 0.3 | 0.3 | 0.3 |
| Pigment[10]* | 2.5 | 2.5 | 0 | 0 |
| ® Tinuvin 770 | 0.05 | 0.05 | 0.05 | 0.05 |
| Aerosol OT[4]* | 0.05 | 0.04 | 0.04 | 0.15 |
| BC-Micro | 46.42 | 46.705 | 0 | 49.150 |
| Plastorit Super[11]* | 0 | 0 | 49.205 | 0 |
| MA[12]* | | | | 3 |

[8]*TEDMA is the crosslinker triethylene glycol dimethacrylate.
[9]*Lecithin is soya lecithin.
[10]*Pigment is colour paste.
[11]*Plastorit Super is a 3-component mineral from the company Naintsch, Austria. This is a lamellar adhesion of the minerals mica, chlorite and quartz, the chemical and physical data being: $SiO_2$: 58.0%, $Al_2O_3$: 20.0%, MgO: 12.0%, FeO: 3.0% and $K_2O$: 2.0%. Screen analysis to DIN 66165 to 12 μm gave 2% residue. The 50% value for grain size distribution is from about 3 to 4 μm, and the 90% value is from about 8 to 9 μm.
[12]*MA is methacrylic acid Shower trays as in 1.4 were produced from the semifinished products of Examples 2 to 4 and Comparative Example 5.

The shower tray of Comparative Example 5 did not have a high-gloss surface. The concentration gradient for Examples 2 to 4 was determined by EDX. EDX is energy-dispersive X-ray microanalysis. The concentration of magnesium, aluminium and silicon is measured here at various depths (thickness d) in the semifinished sheets. The result of determining the concentration gradient in the sheets of the examples was that there was a clear layer of from about 300 to 400 μm at the surface U (for semifinished products of 8 mm thickness). The concentration of fillers then rises gradually as far as a depth d of from 1 to 2 mm, reaching saturation at from 1 to 2 mm.

The shower trays of Examples 1 to 4 fulfilled the requirements of the appropriate standards. In particular, the following tests were carried out by way of example on the shower tray of Example 3, and were passed:

1) Chemicals resistance to EN 249;
2) Temperature cycle resistance to EN 249;
3) Impact resistance to EN 249;
4) Deflection to EN 249 (required: 2 mm) achieved from 2 to 4 mm.

What is claimed is:

1. A shaped article having an outer display surface and an inner surface, wherein the outer display surface of the shaped article is the upper side of a single layer sheet comprising a cured poly(meth)acrylate resin and one or more fillers,
   wherein the single layer sheet has an upper side, a lower side, and a thickness d, and
   wherein the amount of filler at the upper side of the sheet is less than the average amount of filler in the sheet and the amount of filler at the lower side of the sheet is greater than the average amount of filler, wherein the upper side of the sheet extends from the upper surface of the sheet to a depth of 0.1×d and the lower side of the sheet extends from the lower surface to a depth of 0.1×d, wherein the average amount of filler in the sheet is based on the total weight of the sheet.

2. The shaped article according to claim 1, wherein the filler content of the sheet, based on the total weight of the fillers and the total weight of the sheet, is from 20 to 80 percent by weight.

3. The shaped article according to claim 1, wherein the sheet has a discontinuous filler concentration gradient from the upper surface to the lower surface representing a discontinuous change with increasing thickness of the sheet.

4. The shaped article according to claim 1, wherein the concentration of the fillers at the upper surface of the sheet from 0 to 0.01 d is zero.

5. The shaped article according to claim 1, wherein the filler is at least one selected from the group consisting of talc, dolomite, naturally occurring adhesions of talc and dolomite, mica, quartz, chlorite, aluminium oxide, aluminium hydroxide, clays, silicon dioxide, silicates, carbonates, phosphates, sulfates, sulfides, metal oxides, powdered glass, glass beads, ceramics, kaolin, porcelain, crystobalite, feldspar, chalk, carbon and inert-gas-filled hollow microparticles.

6. The shaped article according to claim 1, wherein the filler comprises particles having lamellar or acicular shape.

7. The shaped article according to claim 1, wherein the filler comprises one or more lamellar fillers.

8. The shaped article according to claim 1, wherein the average particle size of the filler is from 0.01 to 80 μm.

9. The shaped article according to claim 1, wherein a residue from the fillers after screening at 20 μm is below two percent by weight.

10. The shaped article according to claim 1, wherein the thickness d is from 1 mm to 12 mm.

11. The shaped article according to claim 1, wherein the sheet comprises a polymerized mixture of

| A) | a) | (meth)acrylate | 50–100% by wt., |
|---|---|---|---|
| | a1) | methyl (meth)acrylate | 0–99.99% by wt., |
| | a2) | $C_2$–$C_4$ (meth)acrylate | 0–99.99% by wt., |
| | a3) | ≧$C_5$ (meth)acrylate | 0–50% by wt., |
| | a4) | (meth)acrylates of functionality two or higher | 0.01–50% by wt., |
| | b) | comonomers | 0–50% by wt., |
| | b1) | vinylaromatics | 0–50% by wt., and |
| | b2) | vinyl esters | 0–50% by wt., | wherein the total amount of all of the components a)–a4) and b)–b2) is 100 percent by weight of the polymerizable component A), B) for each part by weight of A), 0–12 parts by weight of a (pre)polymer soluble or swellable in A), and C) one or more initiators in an amount effective for curing component A), E) for each part by weight of A), an amount of up to 3 parts by weight of one or more conventional additives, and F) for each part by weight of the total weight of A), B), C), and E), from 0.25 to 4 parts by weight of one or more fillers.

12. The shaped article according to claim 11, wherein the mixture has a viscosity in the range from 0.02 to 0.1 Pa·s prior to polymerization.

13. A process for producing the shaped article according to claim 1, comprising
   a) preparing a polymerizable, filled (meth)acrylate formulation,
   b) pouring the formulation into a prepared mold,
   c) polymerizing the formulation in the mold at a temperature above room temperature to give a sheet,
   d) demolding the sheet, and
   f) forming the shaped article from the sheet,
   wherein the viscosity of the formulation prior to polymerization in the mold is from 0.02 to 0.1 Pa·s.

14. The process according to claim 13, further comprising regulating the viscosity of the formulation is regulated by varying the ratio by weight of (pre)polymer to polymerizable monomers.

15. The process according to claim 13, further comprising regulating the viscosity of the formulation by varying the proportion of one or more viscosity adjusting agents.

16. The process according to claim 15, wherein at least one viscosity adjusting agent is an emulsifier.

17. The shaped article according to claim 1, wherein the shaped article is a sanitary item produced by thermoforming the single-layer sheet.

18. The shaped article according to claim 1, wherein the shaped article is a shower tray produced by thermoforming the single-layer sheet.

19. The shaped article claimed in claim 1, wherein the concentration of the fillers in the region from 0 to 0.05 d of the upper side of the sheet is 0.

20. The shaped article claimed in claim 1, wherein the concentration of the fillers in the region from 0 to 0.1 d of the upper side of the sheet is 0.

21. The shaped article claimed in claim 1, wherein the average particle size of the filler is from 0.05 to 30 μm.

22. The shaped article claimed in claim 1, wherein the average particle size of the filler is from 0.1 to 20 μm.

23. The shaped article claimed in claim 1, wherein the thickness d is in the range from 2 to 10 mm.

24. The shaped article claimed in claim 1, wherein the thickness d is in the range from 4 to 8 mm.

25. The process claimed in claim 13, wherein the process is a cell casting process.

26. The shaped article claimed in claim 11, wherein the mixture has a viscosity in the range from 0.03 to 0.08 Pa·s.

27. The shaped article claimed in claim 11, wherein the mixture has a viscosity in the range from 0.04 to 0.06 Pa·s.

28. The shaped article claimed in claim 11, wherein the mixture has a viscosity about 0.05 Pa·s.

29. The process as claimed in claim 13, wherein the viscosity of the formulation in the mold is in the range from 0.03 to 0.08 Pa·s prior to polymerization.

30. The process as claimed in claim 13, wherein the viscosity of the formulation in the mold is in the range from 0.04 to 0.06 Pa·s prior to polymerization.

31. The process as claimed in claim 13, wherein the viscosity of the formulation prior to polymerization in the mold is about 0.05 Pa·s prior to polymerization.

32. The process as claimed in claim 16, wherein the emulsifier is one or more lecithins.

33. The shaped article according to claim 1, wherein the sheet further comprises a means of adjusting the viscosity of the mixture.

* * * * *